United States Patent
Ammons

(10) Patent No.: US 7,289,947 B2
(45) Date of Patent: Oct. 30, 2007

(54) FINDING AND REMOVING PERFORMANCE BOTTLENECKS IN LARGE SYSTEMS

(75) Inventor: Glenn Ammons, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 10/865,437

(22) Filed: Jun. 10, 2004

(65) Prior Publication Data

US 2005/0278183 A1    Dec. 15, 2005

(51) Int. Cl.
*G06F 9/45* (2006.01)
*G06F 17/00* (2006.01)
*G06N 5/00* (2006.01)

(52) U.S. Cl. ............................. 703/22; 706/45
(58) Field of Classification Search ............ 703/22; 706/45

See application file for complete search history.

(56) References Cited

U.S. PATENT DOCUMENTS 5,732,192 A * 3/1998 Malin et al. ................. 703/2

OTHER PUBLICATIONS

David Grove, Craig Chambers "A Framework for Call graph Construction Algorithms" ACM Transactions, Nov. 6, 2001, pp. 685-746.*

W. P. Alexander, R.F. Berry, F.E. Levine, R.J. Urquhart, "A unifying approach to performance analysis in the Java environment" IBM Systems Journal vol. 39 No. 1, 2000, pp. 118-134.*

* cited by examiner

*Primary Examiner*—Paul Rodriguez
*Assistant Examiner*—Dwin McTaggart Craig
(74) *Attorney, Agent, or Firm*—Douglas W Cameron

(57) ABSTRACT

A method and apparatus for finding bottlenecks in software systems and other systems, given profiles that measure costs of the system. A simple profile interface, which is independent of the system and the method for measuring costs, provides operations for summarizing measurements in any profile that associates costs with paths. Then, an analyst uses one or more search tools which use the operations provided by the interface to generate summaries, where costly summaries represent bottlenecks. The set of operations provided by the interface not only support constructing summaries of cost measurements, but also support computing the overlap of summaries.

15 Claims, 2 Drawing Sheets

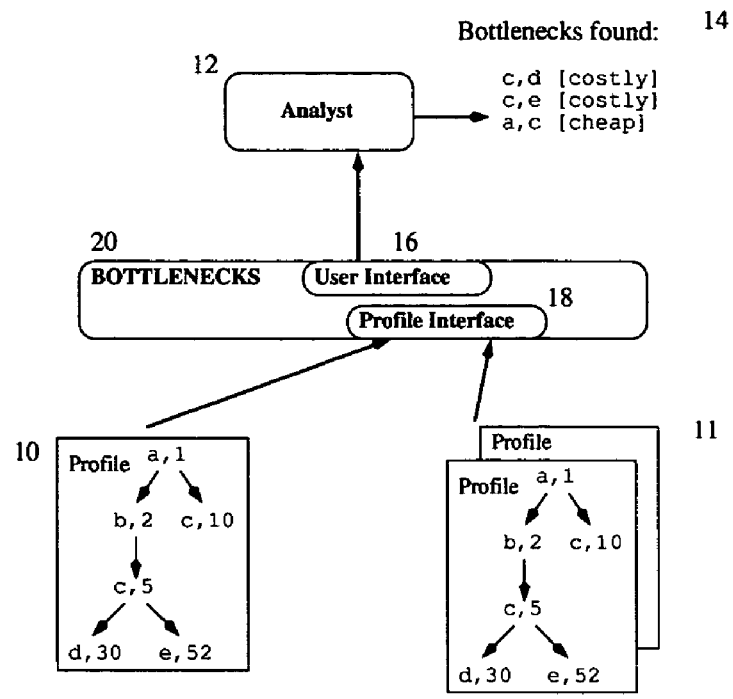

The architecture of BOTTLENECKS.

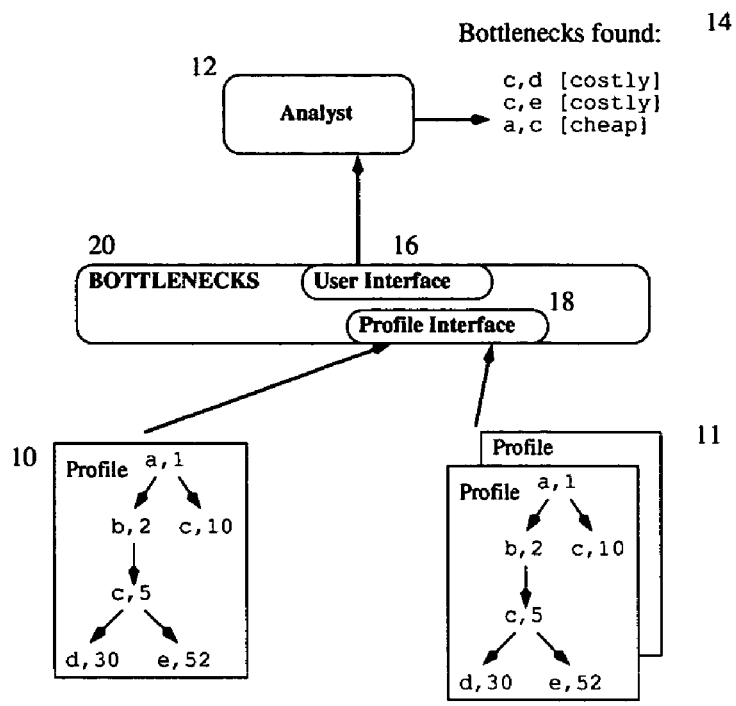

Figure 1: The architecture of BOTTLENECKS.

```
module type PROFILE_INTERFACE =
sig
  type t
  type profile_t
  val path_of :  t -> string list
  val initial_summaries :  profile_t -> t list     (* Construction. *)
  val top_extensions :  t -> string list
  val bottom_extensions :  t -> string list
  val extend_top :  t -> string -> t
  val extend_bottom :  t -> string -> t
  val trim_top :  t -> t option
  val trim_bottom :  t -> t option
  val base_of :  t -> int64                         (* Metrics. *)
  val cum_of :  t -> int64
  val total_base_of :  t list -> int64
  val total_cum_of :  t list -> int64
end
```

Figure 2: The profile interface: a standard interface to profiles that associate a metric with paths.

```
Cost:  25% of total
Context:
  CCommandImpl.execute
  calls TCI.setOutputProperties
  calls AC.doPrivileged
  calls TCommandImpl$1.run
  calls Class.checkMemberAccess
  calls SM.checkMemberAccess
  calls SM.getClassContext
```

Figure 3: A WAS bottleneck, which I found with BOTTLENECKS.

FINDING AND REMOVING PERFORMANCE BOTTLENECKS IN LARGE SYSTEMS

FIELD OF THE INVENTION

This invention is a method and apparatus for finding bottlenecks in the software systems and other systems, given profiles that measure execution costs or other costs of the system.

DESCRIPTION OF THE RELATED ART

J. M. Juran's Pareto principle [15, 13] (also known as the 80/20 rule) admonishes, "Concentrate on the vital few, not the trivial many". For software systems, the Pareto principle says that aggressively optimizing a few execution paths yields large speedups. The principle holds even for large systems like web applications, for which finding the "vital few" execution paths is especially difficult. Consequently, finding bottlenecks in such systems has been the focus of much previous work [21, 18, 1].

In the prior art, a common approach to finding bottlenecks is to measure execution costs and construct a profile that records summaries of the measured costs. Typically, the profile is really a graph, where nodes represent components of a system, edges represent interactions among components, and nodes and/or edges are annotated with costs.

In large systems, when attempting to find bottlenecks, one is faced with two problems: choosing the best way to summarize execution-cost measurements, and keeping track of overlap among bottlenecks.

Execution-cost measurements are summarized mainly for efficiency and understandability. For efficiency, profilers summarize measurements on-line, as the system runs. For example, flat profiles keep one summary per basic block, control-flow edge, or method; call-tree or calling-context-tree profiles [2] keep one summary per calling context; call-graph profiles keep one summary per call-graph edge; and Ball-Larus path profiles [4] keep one summary per intraprocedural, acyclic path.

Understandability of measurements is also crucial because human analysts cannot comprehend large numbers of measurements without summaries. In fact, profilers are usually distributed with report-generation tools that can reduce profiles to flat profiles, no matter how the profiler summarizes measurements internally.

Thus, for reasons of efficiency and understandability, the problem of choosing the best summarization method must be solved in order to find bottlenecks effectively. However, solving this problem is difficult because no summarization scheme suffices to find all bottlenecks.

The second problem in finding bottlenecks is keeping track of overlap among bottlenecks. Two bottlenecks overlap if both summarize measurements of some common cost.

Computing overlap manually is difficult in large profiles, but without computing overlap it is impossible to estimate the potential speedup of optimizing a set of bottlenecks. Because of overlap, while optimizing bottlenecks separately may yield performance improvements in each case, optimizing bottlenecks together might not yield the sum of their separate improvements.

A number of tools produce profiles that associate metrics with execution paths, but all of these tools summarize metrics in some fixed manner. In practice, finding useful bottlenecks requires varying the summarization scheme. Program tracers like QPT [7] record the control flow of an entire execution. Ball-Larus path profilers [4] record intraprocedural, acyclic control-flow paths. Interprocedural path profiles [17] generalize Ball-Larus path profiles. Whole program path profilers [14] record an execution trace in a compact, analyzable form. Calling-context trees [2] are space-efficient cousins of the call-tree profiles we use in this paper. ArcFlow [3], which we used for the experiments in this paper, constructs call-tree profiles on-line by intercepting method entries and exits. Stack sampling [9, 11] is an alternative, lower overhead method. Finally, Ball, Mataga and Sagiv show that intraprocedural paths can be deduced, with significant accuracy, from edge profiles [6].

Many other tools exist for analyzing profiles, such as Hall's call-path refinement profiling [9, 11, 10]. Hall describes a tool for navigating call sequences, but his tool is useable only with his stack-sampling profiler; in practice, it is often necessary to use the best profiler available for a given system, which may or may not be a stack-sampling profiler like Hall's. Also, Hall's tool does not address the issue of overlap and does not support comparing profiles.

Another closely related analysis tool is the Hot Path Browser [5] (HPB), a visualizer for Ball-Larus path profiles. HPB graphically shows overlap among intraprocedural Ball-Larus paths and allows the user to combine profiles by taking their union, intersection, and difference. However, because HPB is tied closely to Ball-Larus paths, it does not support varying the summarization scheme.

There are other performance analysis tools that conflate searching for bottlenecks with collecting cost measurements and so, like Hall's tool, depend on using a specific profiler. For example, Paradyn [18] avoids collecting large amounts of data by interleaving measurement with interactive and automatic bottlenecks analysis. Paradyn's search strategy is top-down, although their DeepStart stack-sampling heuristic [20] can suggest starting points that are deep in the call-tree. Other tools for parallel systems, such as HPCView [16] and SvPablo [8], only analyze flat profiles.

To sum up, the approaches for finding bottlenecks in the prior art share three major failings: they are specific to a particular kind of profile or summarization scheme, they do not support computing overlap among summaries, and they do not support comparing summaries from more than one profile when the summaries are not determined a priori.

SUMMARY OF THE INVENTION

This invention is a method and apparatus for finding bottlenecks in software systems and other systems, given profiles that measure execution costs or other costs of the system. Specifically, a simple profile interface is defined, which provides operations for summarizing profile measurements and which is independent of the system and the method for measuring costs. This interface is implemented for each kind of profile that is of interest. Then, an analyst uses one or more search tools to search for bottlenecks; these search tools use the operations provided by the interface to generate summaries, where costly summaries represent bottlenecks.

The profile interface provides operations for constructing summaries of cost measurements and for computing the overlap of summaries.

The operations of the profile interface associate summaries with paths in a profile's representation as a graph (for example, call sequences), instead of summarizing according to a fixed summarization scheme like call-graphs or call-trees. Of course, any given profiler will use some fixed summarization scheme; however, the interface of this invention provides a flexible mechanism for automatic tools or human analysts to summarize further.

Two summaries overlap if both summarize measurements of some common cost. Because the profile interface makes overlap explicit, execution-time speedup and other performance improvements can be estimated directly from any collection of summaries. Computing overlap also supports the analysis of parallel systems, in which tracking overlap is the crux of the problem.

The profile interface can be implemented for any profile that associates cost measurements with paths, so it isolates analysis tools from the details of the profiles. In fact, by including two implementations of the profile interface, my prototype of the invention supports analyzing call-tree profiles in two very different ways.

One implementation included in the prototype supports finding expensive call sequences by analyzing call-tree profiles. This implementation provides the full precision of the call-tree profile only where it is needed. Where precision is not needed, measurements are summarized just as fully as they are in a flat profile, without losing the ability to estimate speedup.

The second implementation included in the prototype is comparative: it supports finding call sequences that are significantly more expensive in one call-tree profile than in another call-tree profile. For example, if a system is slower in one configuration than another, the cause can be found by comparing a profile of the slow configuration with a profile of the fast configuration.

No matter which implementation is in use, the prototype presents the same user interface to the performance analyst. This user interface manages the bookkeeping of the search and provides simple heuristics that automatically suggest likely bottlenecks.

In one case study, after using the prototype for half an hour, I found 14 bottlenecks in IBM's WebSphere Application Server. By optimizing some of these bottlenecks, a throughput improvement of 23% on the Trade3 benchmark was obtained. The optimizations include novel optimizations of J2EE and Java security, which exploit the high temporal and spatial redundancy of security checks.

BRIEF DESCRIPTION OF THE SEVERAL VIEWS OF THE INVENTION

FIG. 1 is a schematic illustration of an architecture for analyzing bottlenecks in a computer system;

FIG. 2 provides code for a profile interface in accordance with the present invention; and FIG. 3 illustrates a bottleneck located in accordance with the present invention.

DETAILED DESCRIPTION OF THE INVENTION

FIG. 1 is an overview of my prototype of the invention (20), which I call BOTTLENECKS. BOTTLENECKS helps an analyst (12) find bottlenecks (14) in profiles (10, 11). BOTTLENECKS has two parts: the profile interface (18) and the user interface (16).

The profile interface defines an abstraction with adequate power for navigating and analyzing profiles. Specifically, the interface provides operations for constructing various summaries (with associated paths) and for computing the overlap among summaries. The interface is profile independent, because these operations can be implemented for any profile that associates a metric with paths in a graph; as FIG. 1 shows, BOTTLENECKS has one implementation for call-tree profiles (10) and another for comparing two call-tree profiles (11).

The user interface is the abstraction that a human analyst sees. In its simplest usage mode, the user interface allows navigating a profile by inspecting summaries of longer and shorter paths. At this level, the prototype helps the analyst by managing tedious bookkeeping such as remembering which summaries have been inspected. In addition, the user interface is designed to be extended with algorithms that suggest starting places for the analyst's search or that automate parts of the search.

The outline of the rest of this detailed description of the invention is as follows. The section titled "Gathering Profiles" discusses the profiles that can be analyzed with the invention. The section titled "The Profile Interface" discusses the profile interface. The section titled "Implementations of the Profile Interface" explains how I implemented the interface for call-tree profiles and for comparing call-tree profiles. Finally, the section titled "The User Interface" describes the user interface and gives an example of its use.

Gathering Profiles

To collect call-tree profiles, the prototype uses IBM's ArcFlow profiler [3]. ArcFlow builds a call-tree on-line by intercepting method entries and exits. ArcFlow can collect various metrics: I chose to collect executed instructions (as measured by the Pentium 4 performance counters [12]) because ArcFlow can accurately account for its own perturbation of this metric. Time would have been a better metric, but all profilers available to me either perturb this metric too much or collect only flat profiles.

Although the prototype uses ArcFlow to collect call-tree profiles of executed instructions, it does not depend on ArcFlow, on call-tree profiles, or on profiles of executed instructions. With minor extensions to the prototype, any profile that associates costs with paths through a graph could be used.

For example, the nodes of an ArcFlow profile represent methods. However, the invention described here could also be used on profiles where the nodes represent other components of a computer system, such as programs, operating system services, libraries of program code and/or data communicating processes, routines, functions, computers, data structures.

Similarly, the edges of an ArcFlow profile represent invoking a method, but the invention described here could also be used on profiles where the edges represent other interactions among components of a computer system, such as invoking a program, requesting an operating system service, linking or loading a library, communicating with a process, calling a routine, evaluating a function, communicating with a computer, allocating a data structure, deallocating a data structure, referencing a data structure, or containing a component.

Finally, the prototype does not itself assign meaning to the costs, so "executed instructions" could be replaced with other costs, such as execution time, instructions, storage costs, network latency, network bandwidth, metrics collected by a processor's performance counters, metrics collected by an operating system's performance counters, errors, failures, and exceptions, and operating system service requests.

The Profile Interface

The profile interface is a simple abstraction that supports constructing summaries and computing overlap among summaries. Specifically, the interface has operations to generate an initial set of summaries, given a profile; to query summaries; to construct new summaries from old summaries; and to compute overlap among summaries.

In principle, the input profile must be representable as a graph, whose nodes represent components of a system, whose edges represent interactions among the components, and where each path in the graph has an associated cost. However, the graph could be constructed only implicitly or even on-demand, as parts of the graph are required.

FIG. 2 lists code, taken from my prototype, for the profile interface. The code is written in the Objective Caml [19] programming language. The first two lines and the last line of FIG. 2 simply declare PROFILE_INTERFACE as an interface. The remaining lines of FIG. 2 declare the types and operations exported by the interface and are explained below.

The type t is the type of summaries; the type profile_t is the type of the underlying profile. The code in the figure lists interface operations with their types but without their definitions. For example, the operation initial_summaries accepts a profile as its sole argument and returns a list of summaries.

A central principle of the interface is that each summary corresponds to paths in the profile's graph (for example, all paths labeled by a particular call sequence); these paths identify a set of cost measurements. The operation path_of returns the list of labels along a summary's paths, which is assumed in the prototype to be representable as a list of strings (for example, a list of method names).

The profile interface has seven operations for constructing summaries. These operations form a useful set of basic operations. However, the interface could be extended easily to support these operations and more operations, including selecting all paths in a profile or in a summary whose edges have a common sequence of labels, extending all paths associated with a summary by adding edges that have a common label at the head or tail of each path, shortening all paths associated with a summary by removing an edge from the beginning or end of each path, selecting all paths in a profile or in a summary whose edges contain a sequence of labels as a subsequence, selecting all paths in a profile or in a summary whose edge label sequences match a regular expression, selecting all paths in a profile or in a summary whose edge label sequences belong to a formal language, compositions of the previous operations, alternations of the previous operations, or iterations of the previous operations.

Given a profile, the operation initial_summaries returns a set of basic summaries, which, in a typical implementation, correspond to paths of length 1. The other six operations enable constructing summaries that correspond to longer paths. These include operations to query the profile for the list of possible additions to the front or back of a summary's paths (top_extensions and bottom_extensions), to create a new summary by adding a string at the front or back (extend_top and extend_bottom), and to create a new summary by trimming one string from the front or back (trim_top and trim_bottom).

The profile interface supports two metrics for each summary. I assume that the profile associates (implicitly or explicitly) a metric with each path. The operation base_of returns this metric summed over all paths in a summary, which I call the base of a summary. Some profiles also have a concept of a cumulative metric; for example, the cumulative cost of a node in a call-tree profile is the cost of the node itself plus the cost of all its descendants. For such profiles, the operation cum_of returns the cumulative metric of a summary's paths, which I call the cum of the summary.

Finally, total_base_of and total_cum_of return the total base and cum of a list of summaries. The intent is that these operations should account for any overlap among the summaries: even if a cost measurement belongs to more than one summary, it should be counted only once.

Other useful operations about overlap can be defined in terms of total_base_of and total_cum_of. For example, this operation returns the cum overlap of a summary s with a list of summaries S (in Objective Caml, the :: operator takes a value and a list and returns a new list with the value added at the head of the original list):

let cum_ol s S=(cum_of s)+(total_cum_of S)−(total_cum_of (s:: S))

The user interface of BOTTLENECKS assumes only that base_of, cum_of, total_base_of, and total_cum_of are implemented as operations that accept values of the right types as arguments and return values of the right type. There are no other assumptions. In fact, comparative profiles violate many "common sense" assumptions. For example, in comparative profiles, both base and cum may be negative and a summary's cum may be smaller than its base. Nonetheless, implementations should not return haphazard values; although the user interface does not fix an interpretation of these metrics, a natural interpretation should exist. The next section explains what these operations compute in the two implementations contained in BOTTLENECKS.

Implementations of the Profile Interface

This section describes two implementations of the profile interface: one for call-tree profiles and another for comparing two call-tree profiles.

Call-tree Profiles

To implement the profile interface for call-tree profiles, one must implement the types and operations in FIG. 2. The following is a sketch of my implementation, which is both simple and fast enough to navigate call-tree profiles with over a million nodes.

The type profile_t is the type of call-tree profiles; a call-tree profile is a tree where
each node is labeled with a method name and a cost; and
for each calling context $m_0, \ldots, m_k$ that occurred during program execution, there is exactly one path $n_0, \ldots, n_k$ such that $n_0$ is the root of the tree and, for each $0 \leq i \leq k$, $n_i$ is labeled with the method name $m_i$.

Intuitively, a node's cost summarizes all execution-cost measurements that occurred in the node's calling context. The profile (10) that appears in FIG. 1 is a call-tree profile.

Summaries consist of a call sequence and the list of all nodes that root the call sequence:

type t={calls: string list; roots: node list}

A node roots a call sequence if the call sequence labels a path that begins at that node. For example, in the profile (10) in FIG. 1, the call sequence [c] has two roots: namely, the two nodes labeled c. By contrast, the only root of [c; d] is the left node labeled c.

The operation path_of simply returns the calls component of a summary.

The operation initial_summaries traverses the tree and creates a summary for each length-1 call sequence that occurs in the tree. For example, given the profile (10) in FIG. 1, initial_summaries creates five summaries: one each for [a], [b], [c], [d], and [e].

Given a summary s, the operation top_extensions returns all method names m such that m :: path_of(s) labels at least one path in the tree; these names are easy to find by inspecting the parents of s.roots. For example, if s is the summary for [c] in the profile (10) in FIG. 1, then top_extensions(s) returns a and b.

Similarly, bottom_extensions(s) returns all method names m such that path_of(s) @ [m] has at least one root (in Objective Caml, the @ operator concatenates two lists); these names are easy to find by inspecting the children of all nodes reachable by following paths labeled s.calls from nodes in s.roots. For example, if s is the summary for [c] in FIG. 1, then bottom_extensions(s) returns d and e.

Given a summary s and a top extender m of s, extend_top returns the summary s' for m :: path_of(s); s'.roots can be computed easily from s.roots and is never larger than s.roots. The definition of extend_bottom is similar.

I come now to the definitions of the base and cum metrics. For these, I need some auxiliary definitions (as usual, s is a summary):

paths(s) All paths labeled s.calls from nodes in s.roots.
along(s) All nodes that are along some path in paths(s).
interior(s) All nodes that are along some path in paths(s) but not at the end of any such path.
final(s) All nodes that are at the end of some path in paths(s).
descendants(s) All nodes that are descendants of some node in final(s).

Note that the implementation does not necessarily compute these sets. In particular, descendants(s) can be the entire tree, so computing it for each summary is prohibitively expensive.

Given a summary s, the base of s is given by $$\text{base\_of}(s) = \sum_{n \in \text{along}(s)} \text{cost of } n$$

For example, if s is the summary for [c] in the profile (10) in FIG. 1, then base_of(s) is 15.

The cum of s also includes the cost of all descendants of s:

$$\text{cum\_of}(s) = \sum_{n \in \text{along}(s) \cup \text{descendants}(s)} \text{cost of } n$$

For example, if s is the summary for [c] in the profile (10) in FIG. 1, then cum_of(s) is 97.

As mentioned above, computing descendants(s) is too expensive. Thus, when it loads a profile, the prototype precomputes a cum-cost for each node in the tree: the cum-cost of a node equals its cost plus the cost of its descendants. All cum-costs can be computed in one traversal of the tree. Given cum-costs, cum_of(s) can be implemented efficiently by evaluating this formula:

$$\sum_{\substack{n \in \text{interior}(s) \\ n \notin \text{descendants}(s)}} \text{cost of } n + \sum_{\substack{n \in \text{final}(s) \\ n \notin \text{descendants}(s)}} \text{cum-cost of } n$$

This formula can be evaluated quickly because checking for membership of n in descendants(s) can be done in time proportional to the depth of n, by traversing tree edges backwards towards the root.

The reader may be asking why I exclude descendants of s from the sums in the last formula. The reason is that, in the presence of recursion, a node can be in interior(s) or final(s) and also have an ancestor in final(s). If such descendants were not excluded, the sums would count them twice.

Completing the implementation of the profile interface requires implementing total_base_of and total_cum_of. Intuitively, computing cum and base for a set of summaries S is the same as computing cum and base for a single summary, except that now all paths in S must be taken into account. So, I extend the auxiliary functions to functions over sets of summaries:

paths(S) The union over all s∈S of paths(s).
along(S) All nodes that are along some path in paths(S).
interior(S) All nodes that are along some path in paths(S) but not at the end of any such path.
final(S) All nodes that are at the end of some path in paths(S).
descendants(S) All nodes that are descendants of some node in final(S).

Then, the formulas for total_base_of and total_cum_of are the same as the formulas for base_of and cum_of, but with s replaced by S. For example, if S consists of the summary for [a] and the summary for [c] in the profile (10) in FIG. 1, then total_base_of(S) is 16 and total_cum_of(S) is 100.

Comparing Call-tree Profiles

It is sometimes useful to compare two profiles. For example, if a system is slower in one configuration than another, the cause can be found by comparing a profile in the slow configuration with a profile in the fast configuration. Note that the two profiles can be derived in many ways, such as from measurements of the same computer system operating on different data from measurements of the same computer software executing on different hardware, and from measurements of different computer systems.

This section describes an implementation of the profile interface that allows comparing two call-tree profiles.

Comparing two call-tree profiles requires deciding how to relate subtrees of the first profile to subtrees of the second profile. The approach presented here is based on the intuition that analysts are most interested in the cost of paths through programs. Thus, instead of (for example) explicitly constructing a map from subtrees of one profile to subtrees of the other profile, BOTTLENECKS simply compares the cost of a call sequence in one profile with its cost in the other profile.

An advantage of this approach is that the comparative implementation can reuse most of the code of the implementation for single call-tree profiles. The type of summaries is a slight modification of the type of summaries for single call-tree profiles:

type t={calls: string list; a_roots: node list; b_roots: node list}

Instead of one roots field, there is now an a_roots field that lists nodes in the first profile and a b_roots field that lists nodes in the second profile. Thus, a summary s denotes zero or more paths in one tree, and zero or more paths in a second tree.

The operation initial_summaries traverses both trees and produces a list of paths of length 1, of the form
{calls=[m]; a_roots=a_ns; b_roots=b_ns}

Here a_ns lists all roots of [m] in the first tree, while b_ns lists all roots of [m] in the second tree. At least one of these lists is not empty.

The other operations are defined in terms of the operations for a single call-tree profile. For example, if Single.base_of implements base_of for a single call-tree profile, then the comparative base_of is defined by let base_of $s$ = (Single.base_of ({calls = $s$.calls; roots = $s$.a_roots})) −

(Single.base_of ({calls = $s$.calls; roots = $s$.b_roots}))

In general, operations that return numbers are implemented by subtracting the single-tree result for the second profile from the single-tree result for the first profile. Other operations combine the results in other natural ways. For example, top_extensions returns the union of the top extensions in the first and the second profile.

Due to the nature of comparing profiles, the comparative implementation lacks several "common sense" properties. For example, if a summary has a higher base in the second profile than it does in the first profile, then the summary has a negative base in the comparative profile. For similar reasons, the cum of a summary can be lower than its base. These paradoxes arise because of the nature of comparison; the best that an implementation can do is expose them, so that they can be dealt with at a higher level. In practice, I found that they are not problematic, at least when comparing trees that are more similar than they are different.

The User Interface

This section describes the user interface of BOTTLENECKS. This command-line interface provides three kinds of commands: suggestion commands, which request summaries at which to start a search for bottlenecks; a navigation command, which moves from one summary to another; and a labeling command, which assigns labels to summaries. Suggestion and navigation permit the human analyst to find summaries that explain bottlenecks well, without the limitations of fixed summarization schemes like call trees and call graphs. By design, suggestion and navigation are also good points at which to introduce automation. The analyst uses labels to mark interesting summaries. Labels are also the mechanism for requesting overlap computations. During navigation, BOTTLENECKSprints the overlap of each summary with labeled summaries, so that the analyst can avoid investigating redundant summaries.

The rest of this section gives a simplified overview of the user interface and, as an example, demonstrates how to use BOTTLENECKS to uncover a bottleneck in IBM's WebSphere Application Server.

The analyst starts a search by picking a suggester:

<set suggester name> Pick a suggester. A suggester generates an ordered list of starting summaries, based on the profile.

Next, the analyst views the suggestions:

<suggest> Print the suggester's starting summaries.

In the future, if better techniques for finding bottlenecks automatically are discovered, they will be implemented as suggesters. At the moment, BOTTLENECKShas two simple suggesters:

HighCum The HighCum suggester suggests summaries for paths of length 1 (that is, individual methods), with summaries ranked in descending order by their cum. These summaries are good starting points for a top-down search.

HighBase The HighBase suggester also suggests summaries for paths of length 1, but with summaries ranked in descending order by their base. These summaries are good starting points for a bottom-up search.

BOTTLENECKS gives a number to every summary it prints. The analyst navigates from summary to summary by selecting them by number:

<select n> Select the summary numbered n. The summary (call it s) becomes the current summary. BOTTLENECKS prints details about s:

If s has been labeled, the labels of s.

The cum and base metrics of s.

For each unique label l that the analyst has assigned to one or more summaries, the overlap of s's cum and base metrics with summaries labeled l.

The list of labels along paths associated with s.

A numbered list of "nearby" summaries, which can be reached by applying summary construction operations (see FIG. 2).

Generating the list of nearby summaries is another point at which the user interface can be extended with heuristics. BOTTLENECKS has two algorithms for producing this list. The first algorithm simply prints all 1-method extensions and trimmings of the current summary.

The second algorithm, called zooming, omits low-cost extensions and trimmings and greedily "zooms" through extensions and trimmings that concentrate the cost. The goal is to avoid printing uninteresting summaries: low-cost summaries are uninteresting because the user is unlikely to choose them, while summaries that concentrate the cost are uninteresting because the user is almost certain to choose them. In practice, zooming significantly reduces the time it takes to find useful bottlenecks.

Zooming depends on a user-settable cutoff ratio c, which is a positive real number (the default is 0.95). Zooming uses c both to identify low-cost summaries and to identify summaries that concentrate the cost. The following pseudocode shows how zooming finds nearby top extensions (bottom extensions and trimmings are similar):

Routine Zoom(s,c)=ZoomRec(s,c|cum_of(s)|)
Routine ZoomRec(s,C)=
  T:=top extensions of s, in descending order by |cum_of|
  $T_z$:=first N summaries in T, where N>0 is smallest s.t |total_cum_of($T_z$)|≧C, or 0 if no such N exists
  If |$T_z$|=1 Then Return ZoomRec(first($T_z$), C)
  Else Return $T_z$ Sorting $T_z$ by the absolute value of cum_of[1] identifies low-cost summaries. Taking the absolute value is necessary for comparative profiles, in which a summary's cum can be negative. The conditional tests for summaries that concentrate the cost. If the cost of a summary is at least C, the algorithm assumes that the user would select it and zooms through it.

For example, suppose that the current summary is for [cd] in the profile (10) in FIG. 1. If zooming were enabled, BOTTLENECKS would zoom to the 2-method top extension [abcd] instead of listing the 1-method top extension [bcd].

Finally, BOTTLENECKS provides a labeling command, which the analyst uses to mark interesting summaries:

<label name> Assign the label name to the current summary.

Once labeled, a summary can be inspected later or saved to a file. More importantly, as the analyst searches for bottlenecks, BOTTLENECKS displays the overlap of the current summary with labeled summaries. Accounting for overlap is key to estimating the expected benefit of optimizing a particular bottleneck; therefore, after the first bottleneck has been found, the analyst must take overlap into account when selecting the next summary.

Note that BOTTLENECKS does not interpret labels; labels have meaning for the analyst, not for BOTTLENECKS.

An Example

Like other application servers, WAS is slower when its security features are enabled. To find the cause of this slowdown, I ran the Trade3 application server benchmark twice, the first time with security enabled and the second time with security disabled, and compared them with BOTTLENECKS, using the comparative implementation of the profile interface.

FIG. 3 lists one of the bottlenecks that I found. This bottleneck accounted for one-quarter of the overhead of enabling security (the line labeled "Cost:" in FIG. 3) and corresponds to a calling context (the lines following the line labeled "Context:" in FIG. 3) in which CCommandImpl.execute indirectly calls SM.getClassContext. As it happens, CCommandImpl.execute is a method that is called once for every Trade3 command and SM.getClassContext is an expensive method related to security. Note that method and class names have been shortened to fit on a line.

The remainder of this section works through a session in which we find the bottleneck in FIG. 3, using BOTTLENECKS and a bottom-up approach.

The first steps are to choose an appropriate suggester and list the highly ranked suggestions. The HighBase suggester is better for a bottom-up search:

set suggester HighBase
suggest

BOTTLENECKS prints the summaries with highest base. The highest-ranked summary is for the call sequence

[SM.getClassContext]

which has a base that accounts for 9.85% of the total security overhead—that is, 9.85% of the difference between the cost when security is enabled and the cost when security is disabled. As it happens, this method is never called when security is disabled. We look at this summary more closely:

select 0

This sets [SM.getClassContext] as the current summary (call it s). BOTTLENECKS prints s, the base and cum of s, and s's top and bottom extensions (with a number assigned to each one). In this case, there are no bottom extensions, and the top extension

[SM.checkMemberAccess; SM.getClassContext]

(call this s') has a much higher cum than the other choices. This is extension number 0, and we look at it more closely:

select 0

This sets s' as the current summary and BOTTLENECKS prints s' and its metrics and extensions; the length of s' is greater than 1, so BOTTLENECKS also prints the summaries that result from trimming the top or bottom method of s' (the former is s again).

The next step is to extend s' at the top. In general, we repeatedly extend the current summary by choosing the extension with the highest cum. This process continues until all potential extensions have a low cum, or until there are many possible extensions, no one of which contributes substantially to the overhead. Note that, if we were using zooming, this process would be mostly automatic.

In this case, we continue extending at the top until we reach the summary in FIG. 3. At this point, there are many top extensions (for various Trade3 commands) and none of them contribute substantially to the overhead. This summary contributes 25% of the total overhead, which is significant, so we decide that it is a bottleneck and label it:

label "bottleneck"

References [3, 12, 19] are incorporated herein by reference.

REFERENCES

[1] Marcos K. Aguilera, Jeffrey C. Mogul, Janet L. Wiener, Patrick Reynolds, and Athicha Muthitacharoen. Performance debugging for distributed systems of black boxes. In *Proceedings of the Nineteenth ACM Symposium on Operating Systems Principles*, pages 74-89. ACM Press, 2003.

[2] Glenn Ammons, Thomas Ball, and James R. Larus. Exploiting hardware performance counters with flow and context sensitive profiling. In *Proceedings of the ACM SIGPLAN 1997 Conference on Programming Language Design and Implementation*, pages 85-96. ACM Press, 1997.

[3] Real-time ArcFlow, which can be found on the web site ibm.com on the page developerworks/oss/pi.

[4] Thomas Ball and James R. Larus. Efficient path profiling. In *Proceedings of the 29th Annual ACM/IEEE International Symposium on Microarchitecture*, pages 46-57. IEEE Computer Society, 1996.

[5] Thomas Ball, James R. Larus, and Genevieve Rosay. Analyzing path profiles with the Hot Path Browser. In *Workshop on Profile and Feedback-Directed Compilation*, 1998.

[6] Thomas Ball, Peter Mataga, and Shmuel Sagiv. Edge profiling versus path profiling: The showdown. In *Symposium on Principles of Programming Languages*, pages 134-148, 1998.

[7] Tom Ball and James R. Larus. Optimally profiling and tracing programs. *ACM Transactions on Programming Languages and Systems*, 16(3):1319-1360, July, 1994.

[8] Luiz DeRose and Daniel A. Reed. SvPablo: A multi-language architecture-independent performance analysis system. In *Proceedings of the International Conference on Parallel Processing (ICPP '99)*, September 1999.

[9] Robert J. Hall. Call path refinement profiles. *IEEE Transactions on Software Engineering*, 21(6):481-496, June 1995.

[10] Robert J. Hall. Call path refinement profiles. U.S. Pat. No. 5,828,883, October 1998.

[11] Robert J. Hall. CPPROFJ: Aspect-capable call path profiling of multi-threaded Java applications. In *Proceedings of the 17th IEEE International Conference on Automated Software Engineering (ASE '02)*, pages 107-116, September 2002.

[12] Intel. IA-32 *Intel Architecture Software Developer's Manual, Volume 3: System Programming Guide*, 2004.

[13] Joseph M. Juran and A. Blanton Godfrey, editors. *Juran's Quality Handbook*. McGraw-Hill, New York, N.Y., USA, fifth edition, 1999.

[14] James R. Larus. Whole program paths. In *Proceedings of the ACM SIG-PLAN 1999 Conference on Programming Language Design and Implementation*, pages 259-269. ACM Press, 1999.

[15] Thomas J. McCabe and G. Gordon Schulmeyer. *Handbook of Software Quality Assurance*, chapter The Pareto Principle Applied to Software Quality Assurance, pages 178-210. Van Nostrand Reinhold Company, 1987.

[16] John Mellor-Crummey, Robert Fowler, Gabriel Marin, and Nathan Tallent. HPCView: A tool for top-down analysis of node performance. *The Journal of SuperComputing,* 23:81-101, 2002.

[17] David Melski and Thomas W. Reps. Interprocedural path profiling. In *Computational Complexity,* pages 47-62, 1999.

[18] Barton P. Miller, Mark D. Callaghan, Jonathan M. Cargille, Jeffrey K. Hollingsworth, R. Bruce Irvin, Karen L. Karavanic, Krishna Kunchithapadam, and Tia Newhall. The Paradyn parallel performance measurement tool. *IEEE Computer,* 28(11):37-46, 1995.

[19] Objective Caml, which can be found on the ocaml.org web site.

[20] Philip C. Roth and Barton P. Miller. Deep start: A hybrid strategy for automated performance searches. In *Euro-Par* 2002, number 2400 in Lecture Notes in Computer Science, August 2002.

[21] G. Sevitsky, W. De Pauw, and R. Konuru. An information exploration tool for performance analysis of Java programs. In *Proceedings of TOOLS Europe,* 2001.

What is claimed is:

1. A method of finding costly interactions among components of a computer system, said method comprising:
   a. defining a graph having nodes which represent said components and having edges which represent interactions among said components;
   b. measuring costs of said system such that each path in said graph has an associated cost;
   c. defining a path-based interface, said interface providing operations to generate summaries which represent costs for associated paths in said graph and providing operations to query any of said summaries for its costs and associated paths, wherein said operations to generate said summaries comprise at least one of the following: selecting all paths in said graph whose edges have a common sequence of labels, selecting all paths in a given summary whose edges have a common sequence of labels, extending all paths associated with a given summary by adding edges that have a common label at one of the head and the tail of each path, shortening all paths associated with a given summary by removing an edge from one of the beginning and the end of each path, selecting all paths in said graph whose edges contain a given sequence of labels as a subsequence, selecting all paths in a given summary whose edges contain a given sequence of labels as a subsequence, selecting all paths in said graph whose edge label sequences match a given regular expression, selecting all paths in a given summary whose edge label sequence match a given regular expression, selecting all paths in said graph whose edge label sequences belong to a given formal language, selecting all paths in a given summary whose edge label sequences belong to a given formal language, performing compositions of the previous operations, performing alternations of the previous operations, and performing iterations of the previous operations;
   d. using the operations provided by the path-based interface to find costly summaries, whose associated paths represent costly interactions among components of the system; and
   e. displaying summary information to a user.

2. A method as recited in claim 1, wherein said components comprise at least one of the following: programs, operations system services, libraries of program code, libraries of data, communicating processes, routines, functions, computers, and data structures.

3. A method as recited in claim 1, wherein said interactions comprise at least one of the following: invoking a program, requesting an operation system service, linking or loading a library, communicating with a process, calling a routine, evaluating a function, communicating with a computer, allocating a data structure, deallocating a data structure, referencing a data structure, and containing a component.

4. A method as recited in claim 1, wherein said costs comprise at least one of the following: the number of virtual machine instructions executed by the components along a path, and the number of processor instructions executed by the components along a path.

5. A method as recited in claim 1, wherein said costs comprises at least one of the following: execution time, instructions, storage costs, network latency, network bandwidth, metrics collected by a processor's performance counters, metrics collected by an operating system's performance counters, errors, failures, and exceptions, and operating system service requests.

6. A method as recited in claim 1, wherein said operations to query said summaries comprise at least one of the following: listing the paths associated with a given summary, listing the construction operations that apply to a given summary, listing the total cost of the paths associated with a summary while accounting for any overlap among those costs, and listing the total cost of the paths associated with at least one while accounting for any overlap among those costs.

7. A method as recited in claim 1, wherein said path-based interface provides operations for constructing summaries associated with execution paths of said system.

8. A method as recited in claim 1, wherein said graph is a calling-context tree, in which each node represents a routine or set of routines and each edge represents a caller-callee interaction.

9. A method as recited in claim 1, wherein a search tool uses said operations in searching among said summaries.

10. A method as recited in claim 9, wherein said search tool supports a zooming operation.

11. A method of locating costly interactions among components of one or more computer systems, said method comprising:
   a. defining at least two graphs, each graph having nodes which represent components of said systems and having edges which represent interactions among said components;
   b. measuring costs of said systems such that each path in said graphs has an associated cost;
   c. defining a path-based interface, which is independent of any system and any method for measuring said costs, said interface providing operations to generate summaries, which represent differences in costs for associated paths between one of said graphs and another of said graphs, and providing operations to query any of said summaries for its cost differences and associated paths, wherein said operations to generate said summaries comprise at least one of the following: selecting all paths in said graph whose edges have a common sequence of labels, selecting all paths in a given summary whose edges have a common sequence of labels, extending all paths associated with a given summary by adding edges that have a common label one of the beginning and the end of each path, shortening all paths associated with a given summary by removing an edge from one of the beginning and the end of each path, selecting all paths in said graph whose edges contain a given sequence of labels as a subsequence, selecting all paths in a given summary whose edges contain a given sequence of labels as a subsequence, selecting all paths in said graph whose edge label sequences match a given regular expression, selecting all paths in a given summary whose edge label sequence match a given regular expression, selecting all paths in a graph whose edge label sequences belong to a given formal language, selecting all paths in a given summary whose edge label sequences belong to a given formal language, performing compositions of the previous operations, performing alternations of the previous operations, and performing iterations of the previous operations; and d. using the operations provided by the path-based interface to find summaries with high cost differences, whose associated paths represent interactions among components of the system whose cost differs greatly between one of said graphs and another of said graphs; and e. displaying summary information to a user.

12. A method as recited in claim 11, wherein said graphs are derived from measurements of the same computer system operating on different data.

13. A method as recited in claim 11, wherein said graphs are derived from measurements of the same computer software executing on different hardware.

14. A method as recited in claim 11, wherein said graphs are derived from measurements of different computer systems.

15. An article of manufacture for a method of finding costly interactions among components of a computer system, the article of manufacture comprising a machine-readable medium containing one or more programs which when executed implement the steps of:

a. defining a graph having nodes which represent said components and having edges which represent interactions between said components;

b. measuring costs of said system such that each path in said graph has an associated cost;

c. defining a path-based interface, which is independent of any system and any method for measuring said costs, said interface providing operations to generate summaries which represent costs for associated paths in said graph and providing operations to query any of said summaries for its costs and associated paths, wherein said operations to generate said summaries comprise at least one of the following: selecting all paths in said graph whose edges have a common sequence of labels, selecting all paths in a given summary whose edges have a common sequence of labels, extending all paths associated with a given summary by adding edges that have a common label one of the beginning and the end of each path, shortening all paths associated with a given summary by removing an edge from one of the beginning and the end of each path, selecting all paths in said graph whose edges contain a given sequence of labels as a subsequence, selecting all paths in a given summary whose edges contain a given sequence of labels as a subsequence, selecting all paths in said graph whose edge label sequences match a given regular expression, selecting all paths in a given summary whose edge label sequence match a given regular expression, selecting all paths in a graph whose edge label sequences belong to a given formal language, selecting all paths in a given summary whose edge label sequences belong to a given formal language, performing compositions of the previous operations, performing alternations of the previous operations, and performing iterations of the previous operations; and d. using the operations provided by the path-based interface to find costly summaries, whose associated paths represent costly interactions among components of the system; and e. displaying summary information to a user.

* * * * *